UNITED STATES PATENT OFFICE.

ALBERT Y. WERNER AND PEARIS B. ELLIS, OF CARSON CITY, NEVADA, ASSIGNORS, BY DIRECT AND MESNE ASSIGNMENTS, OF ONE-THIRD TO WILLIAM M. STEWART AND CHARLES J. KAPPLER, OF CARSON CITY, NEVADA.

METHOD OF EXTRACTING RUBBER-LIKE GUM FROM GREASEWOOD.

SPECIFICATION forming part of Letters Patent No. 697,957, dated April 15, 1902.

Application filed September 28, 1901. Serial No. 76,883. (No specimens.)

*To all whom it may concern:*

Be it known that we, ALBERT Y. WERNER and PEARIS B. ELLIS, residing at Carson City, in the county or Ormsby and State of Nevada, have invented certain new and useful Improvements in Methods of Extracting Rubber-Like Gum from Greasewood, of which the following is a specification.

This invention relates to a method of extracting a gum identical with or greatly resembling the india-rubber of commerce from the greasewood shrub or plant commonly found in the Rocky Mountain regions of the United States and known to botanists by the name of "*Chrysothamnus*" or "*Begelovia.*"

We have already made application for a process and product resembling or identical with rubber, the same being numbered 60,579, filed May 16, 1901. The present invention embraces sundry improvements on said process or method.

In practicing our improved method we take the stems and branches of the greasewood-plant and pass them through crushing-rolls, which crush and bruise the stalks. The leaves of the plant may or may not be included; but as the leaves contain a comparatively small quantity of gum they may well be excluded. After the material has been crushed or broken and flattened by the rolls it is inclosed in a vat, kettle, or digester and covered with water, which is gradually brought nearly to boiling temperature by the application of heat or introduction of steam. While heated the mixture is agitated by stirring or other mechanical means. After a thorough steeping, which may continue from a few minutes to an hour or more, the heated water and contained matter are drawn off and strained while hot. The mass remaining in the receptacle is then subjected to the action of steam for a short time, usually only a few minutes. The mass is then withdrawn from the receptacle and subjected to pressure to expel all the liquid substance, as far as may be. This liquid is strained and added to that already withdrawn from the receptacle, and the liquid is then slowly evaporated, nearly to dryness. When the residuum of the evaporating liquid reaches a gummy consistency, a powerful solvent is added. We have found good results to follow from the use of benzin, benzole, or similar solvents of rubber. The gum is apparently dissolved by the solvent, leaving the detritus of insoluble matter. The solvent and dissolved material are now drawn off for distillation, if it be desired to recover the solvent, as is usually the case. The solvent may be driven off by distillation, in usual manner, or by evaporation, which is effectual, but more expensive. The residuum is a dark-colored gum with a pungent balsamic odor, having very many, if not all, the properties of the caoutchouc of commerce. It is exceedingly tough and elastic and while hot can be rolled or drawn into thin sheets or fine threads, but at ordinary temperatures is very tenacious of its original form and will return to this form as rubber does under like treatment.

What we claim, and desire to secure by Letters Patent, is—

1. The method of extracting a rubber-like gum from the greasewood-plant, which consists in crushing the stalks of said plant, steeping the same in water, withdrawing the water and subjecting the material to steam, expressing the liquid, partially evaporating the liquid withdrawn, and dissolving the gum therefrom by a rubber solvent, substantially as described.

2. The method of extracting a rubber-like gum from the greasewood-plant, which consists in crushing the stalks of said plant, steeping the crushed material in water and withdrawing the liquid from the stalks, evaporating the bulk of the water and replacing the same by a solvent of rubber, and distilling the solvent and its contained material to produce a gum similar in many respects to caoutchouc.

In testimony whereof we affix our signatures in presence of witnesses.

ALBERT Y. WERNER.
PEARIS B. ELLIS.

Witnesses:
A. S. BETTENCOURT,
E. S. DOUGHERTY,
H. C. MULCAHY,
J. B. VONIVA.